United States Patent [19]
Wesey

[11] Patent Number: 6,008,728
[45] Date of Patent: Dec. 28, 1999

[54] WATER LEVEL ALARM SYSTEM

[76] Inventor: Akintunde O. Wesey, 1351 W. 30th Pl., Los Angeles, Calif. 90007

[21] Appl. No.: 09/199,249

[22] Filed: Nov. 25, 1998

[51] Int. Cl.⁶ .................................................. G08B 21/00
[52] U.S. Cl. ........................ 340/618; 340/621; 73/290 R; 200/61.01; 200/61.2
[58] Field of Search ..................... 340/618, 621, 340/623, 624; 73/305, 307, 319, 290 R, 290 V; 200/61.01, 61.2, 84 R, 84 B

[56] References Cited

U.S. PATENT DOCUMENTS

| | | | |
|---|---|---|---|
| 4,377,809 | 3/1983 | Lawford | 340/623 |
| 4,757,305 | 7/1988 | Peso | 340/624 |
| 4,771,272 | 9/1988 | Barnes | 340/624 |
| 4,917,155 | 4/1990 | Koblasz et al. | 141/1 |
| 5,028,910 | 7/1991 | Meacham et al. | 340/616 |
| 5,483,227 | 1/1996 | Kuo et al. | 340/623 |
| 5,661,462 | 8/1997 | Shrewsbury-Gee | 340/618 |

Primary Examiner—Julie Lieu

[57] ABSTRACT

A water level detecting and alarm system for informing a user when a water level within a bathtub has risen to or above a desired level. The system includes a housing having an opening at one end forming a lower lumen and a closed end opposite thereof. A securing means is attached to a side of the housing for adjustably securing to an interior surface of the bathtub corresponding to desirable water level. A partition within the housing is oriented traverse to a longitudinal axis of the housing. A tube projects in and through the partition coaxial with the longitudinal axis of the housing. A shaft has a flanged end and a lower end, and slidably projects through the tube. A float slidably projecting in the lower lumen of the housing for having a latitude similar to the water level within the bathtub. The float is secured to the lower end of the shaft for elevating and descending the shaft in a manner corresponding to the water level. The flanged end prevents the float from being completely removed from the housing. An alarm device in the housing engages the flanged end of the shaft. Upon engagement of the flanged end with the alarm device, the alarm device emits an audible alarm warning a user that the water level is at a desired level.

10 Claims, 6 Drawing Sheets

WATER LEVEL ALARM SYSTEM

BACKGROUND OF THE INVENTION

1. Field of the Invention

The present invention relates to alarms for water level detection and more particularly pertains to a new water level alarm system for sounding an alarm when the water level in a receptacle reaches a prescribed upper limit. The receptacle or vessel may be a bathtub, lavatory basin or lower level room with a sump pump that has failed to operate.

2. Description of the Prior Art

The use of alarms for water level detection is known in the prior art. More specifically, alarms for water level detection heretofore devised and utilized are known to consist basically of familiar, expected and obvious structural configurations, notwithstanding the myriad of designs encompassed by the crowded prior art which have been developed for the fulfillment of countless objectives and requirements.

Known prior art alarms for water level detection include U.S. Pat. No. 5,371,491; U.S. Pat. No. 4,757,305; U.S. Pat. No. 4,080,985; U.S. Pat. No. 4,020,481 with a floating magnetic level sensor warning of a shortfall below a specified level; U.S. Pat. No. 4,801,926 with a floating magnetic level sensor with centering means and U.S. Design Pat. Des. 313,567.

While these devices fulfill their respective, particular objectives and requirements, the aforementioned patents do not disclose a new water level alarm system that operates on battery power. The new water level alarm system for sounding an audible alarm when water reaches a prescribed level to save energy and conserve water and prevent damage that overflowing water can cause is portable and can be moved for installation in a variety of places. The inventive device includes a sensor housing, a sensor housing upward end, sensor housing sidewalls, sensor housing medial portion and a sensor housing downward end with a large vertical bore, and the sensor housing medial portion having a small vertical bore; means attaching the sensor housing to a bathtub or water vessel; a float slidingly engaged within the large vertical bore; an elongate vertical member, having a lower member end, a middle member portion and an upper member end, the lower member end being attached the float, the middle member portion being slidingly engaged within in the small vertical bore, and the upper member end contacting a compressible air chamber located in the sensor housing between the sensor housing upper end and the sensor housing medial portion and small vertical bore. An alarm housing with speaker holes and a switch orifice at an upper end, alarm housing sidewalls extending downwardly to an alarm housing lower end, an alarm housing bottom connected to the alarm housing sidewalls is attached to the top of the sensor housing. The alarm housing bottom has a float orifice in vertical alignment with the vertical member. The float orifice permits unobstructed passage of the upper member end as the float moves. An audible alarm module is mounted within the alarm housing. The audible alarm module includes a serially connected electrical circuit comprising: a sound transducer underlying the speaker holes, a battery, a water resistant switch underlying the switch orifice, a solid state pressure sensitive switch having a characteristic such that the switch is conductive when pressure exceeds a prescribed value. Upward movement of the float pushes the upper member end through the float orifice contacting the compressible air chamber transmitting pressure through the pressure port into the solid state pressure switch exceeding the prescribed pressure threshold completing the electrical circuit of the sold state pressure switch, the battery, water resistant switch and sound transducer and sounding the alarm.

In these respects, the Water level alarmSystem according to the present invention substantially departs from the conventional concepts and designs of the prior art, and in so doing provides an apparatus primarily developed for the purpose of sounding an audible alarm when water reaches a prescribed level to save energy and conserve water and optionally turn off water automatically.

SUMMARY OF THE INVENTION

In view of the foregoing disadvantages inherent in the known types of alarms for water level detection now present in the prior art, the present invention provides a new water level alarmSystem construction wherein the same can be utilized for sounding an audible alarm when water reaches a prescribed level to save energy and conserve water and optionally turn off water automatically.

The general purpose of the present invention, which will be described subsequently in greater detail, is to provide a new water level alarmsystem apparatus and method which has many of the advantages of the alarms for water level detection mentioned heretofore and many novel features that result in a new water level alarm system which is not anticipated, rendered obvious, suggested, or even implied by any of the prior art alarms for water level detection, either alone or in any combination thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new water level alarm system apparatus and method which has many of the advantages of the alarms for water level detection mentioned heretofore and many novel features that result in a new water level alarmsystem which is not anticipated, rendered obvious, suggested, or even implied by any of the prior art alarms for water level detection, either alone or in any combination thereof.

It is another object of the present invention to provide a new water level alarm system which may be easily and efficiently manufactured and marketed.

It is a further object of the present invention to provide a new water level alarmsystem which is of a durable and reliable construction.

An even further object of the present invention is to provide a new water level alarm system which is susceptible of a low cost of manufacture with regard to both materials and labor, and which accordingly is then susceptible of low prices of sale to the consuming public, thereby making such water level alarm system economically available to the buying public.

Still yet another object of the present invention is to provide a new water level alarm system which provides in the apparatuses and methods of the prior art some of the advantages thereof, while simultaneously overcoming some of the disadvantages normally associated therewith.

Still another object of the present invention is to provide a new water level alarm system for sounding an audible alarm when water reaches a prescribed level to save energy and conserve water and optionally turn off water automatically.

Still yet another object of the present invention is to provide a new water level alarm system that is portable and repositionable within any bathtub to provide an audible alarm when a the water level has reached the desired level.

Even still another object of the present invention is to provide a new water level alarm system that used a sealed noncontact switch that is moisture resistant.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
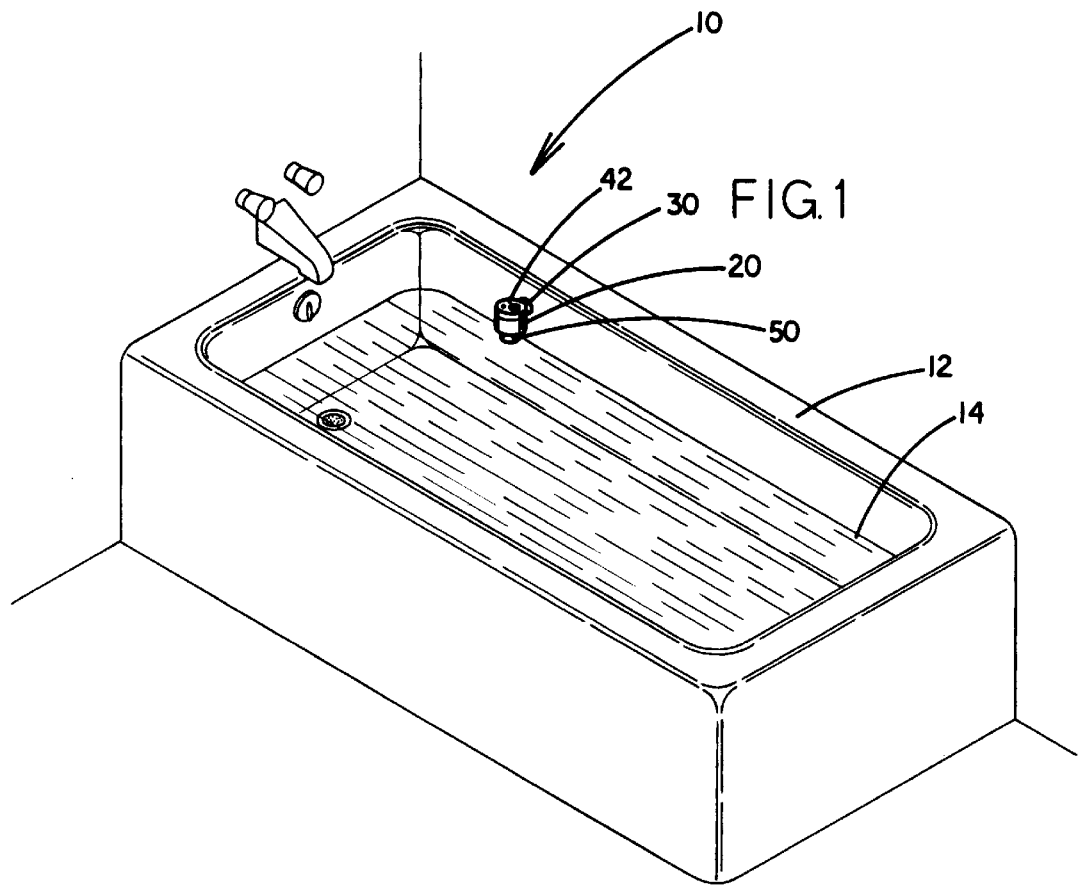
FIG. 1 is a right side perspective view of a new water level alarm system according to the present invention.

With reference now to the drawings, and in particular to FIGS. 1 through 10 thereof, a new water level alarm system embodying the principles and concepts of the present invention and generally designated by the reference numeral 10 will be described.

Figure 4:
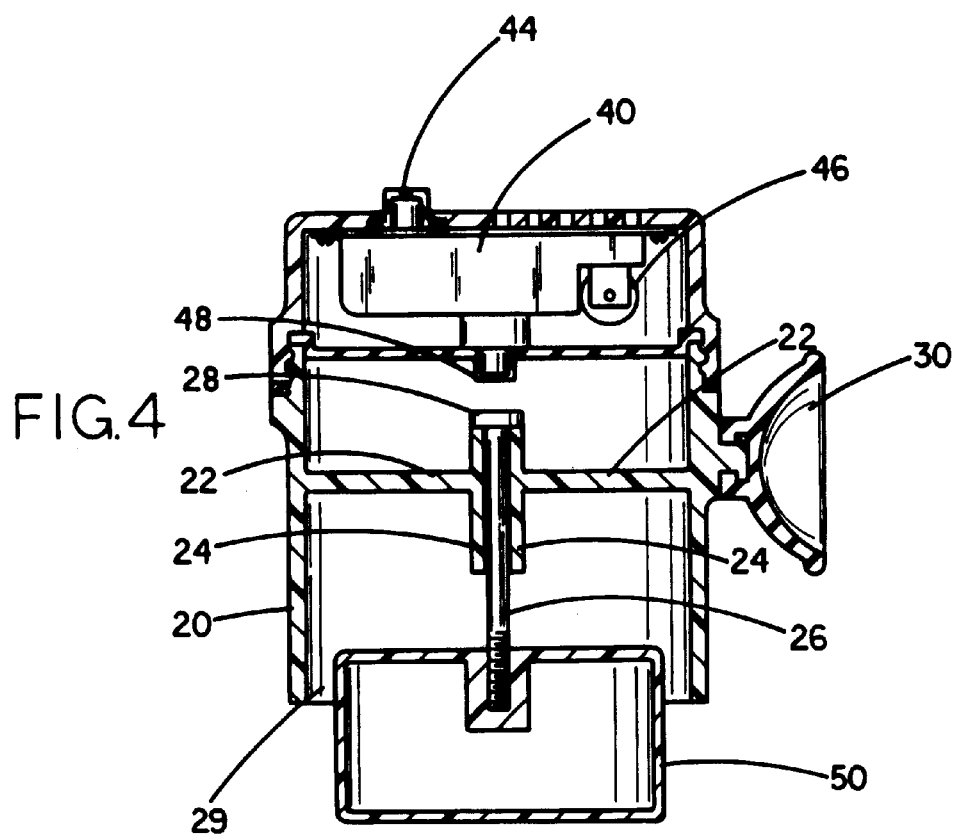
FIG. 4 is a cross sectional view taken along line 4—4 of FIG. 3.

More specifically, it will be noted that the water level alarm system 10 comprises a housing 20 having an opening at one end forming a lower lumen 29 and a closed end opposite thereof thereby defining an interior portion. A securing means is attached to a side of the housing 20 for adjustably securing to an interior surface of the bathtub 12 corresponding to desirable water level 14. The securing means is preferably a suction cup 30. A partition 22 is within the housing 20 traverse to a longitudinal axis of the housing 20 as shown in FIG. 4 of the drawings. A tube 24 projects within and through the partition 22 coaxial with the longitudinal axis of the housing 20. A shaft 26 has a flanged end 28 and a lower end. The shaft 26 slidably projects through the tube 24 as shown in FIG. 4 of the drawings. A float 50 slidably projects within the lower lumen 29 of the housing 20 for having a latitude similar to the water level 14 within the bathtub 12. The float 50 is secured to the lower end of the shaft 26 for elevating and descending the shaft 26 corresponding to the water level 14 and wherein the flanged end 28 prevents the float 50 from being completely removed from the housing 20. An alarm device 40 is within the housing 20 and engageable by the flanged end 28 of the shaft 26. Upon engagement by the flanged end 28 with the alarm device 40, the alarm device 40 emits an audible alarm warning a user that the water level 14 is at a desirable level.

Figure 2:
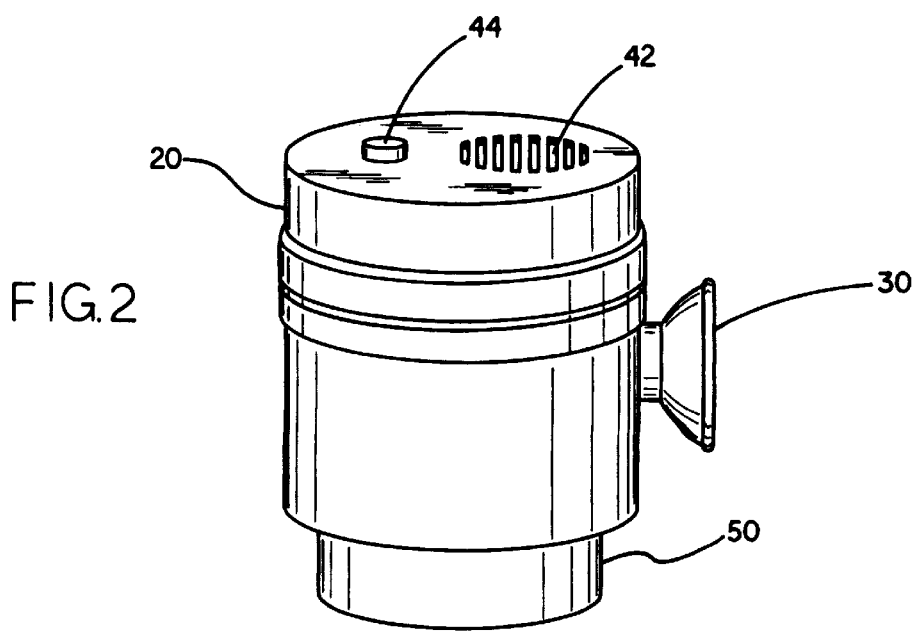
FIG. 2 is a side elevation view thereof.
Figure 3:
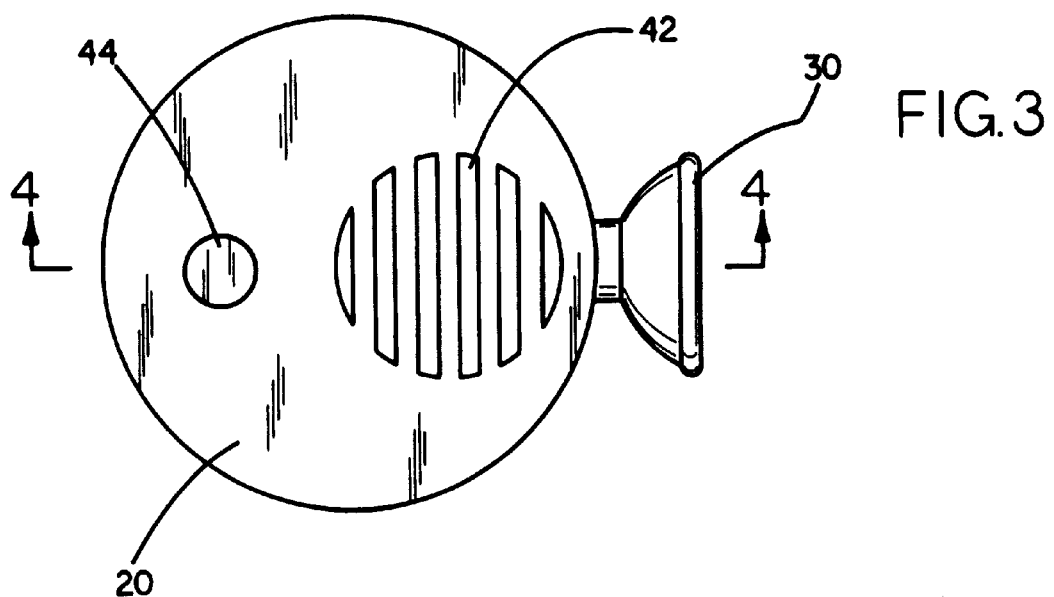
FIG. 3 is a top view of the present invention.
Figure 5:
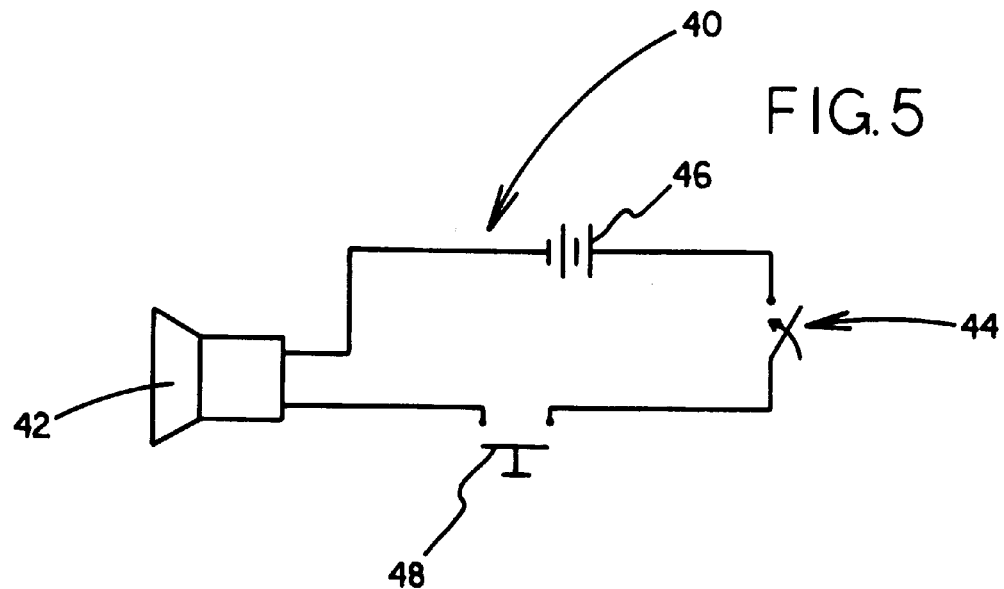
FIG. 5 is a schematic of the alarm module.

As shown in FIGS. 1 through 5 of the drawings, the alarm device 40 comprises an activation switch 48 for engagement with the flanged end 28 of the shaft 26, wherein the activation switch 48 is normally open. A power source 46 is electrically connected to the activation switch 48 as shown in FIG. 5 of the drawings. A speaker 42 is electrically connected to the activation switch 48 opposite of the power source 46 for emitting the audible alarm upon a closing of the activation switch 48 by the flanged end 28 of the shaft 26. The alarm device 40 further includes a power switch 44 electrically connected between the activation switch 48 and the power source 46. The power switch 44 allows a user to manually control operation of the present invention. The power switch 44 is secured within an upper portion of the housing 20 as best shown in FIGS. 2 and 3 of the drawings.

Figure 6:
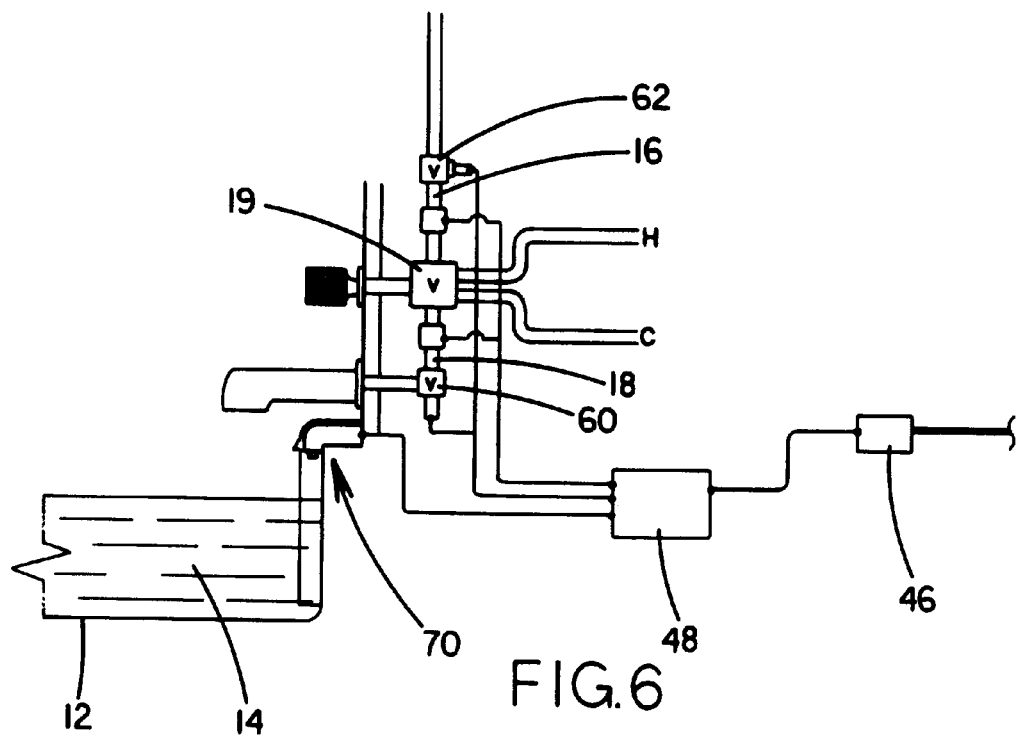
FIG. 6 is a side view of an embodiment of the present invention having first and second solenoid valves to control the faucets of the bathtub.
Figure 7:
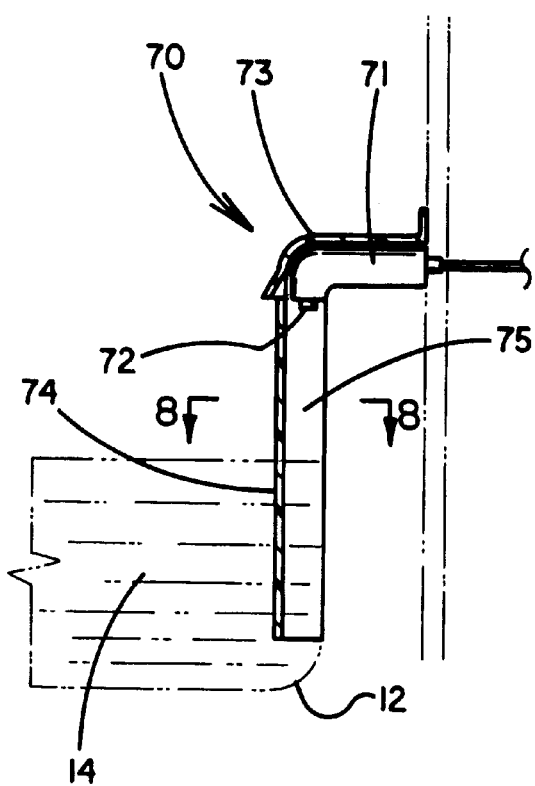
FIG. 7 is a side view of the optional embodiment of the invention with the sonar means.
Figure 8:
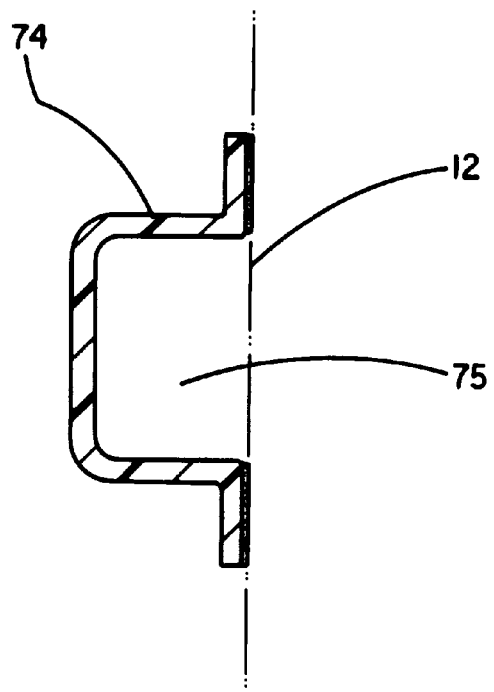
FIG. 8 is a cross sectional view taken from line 8—8 on FIG. 7 showing the positioning of the channel of the lower portion of the shield member positioned adjacent the inner wall of a bathtub.
Figure 9:
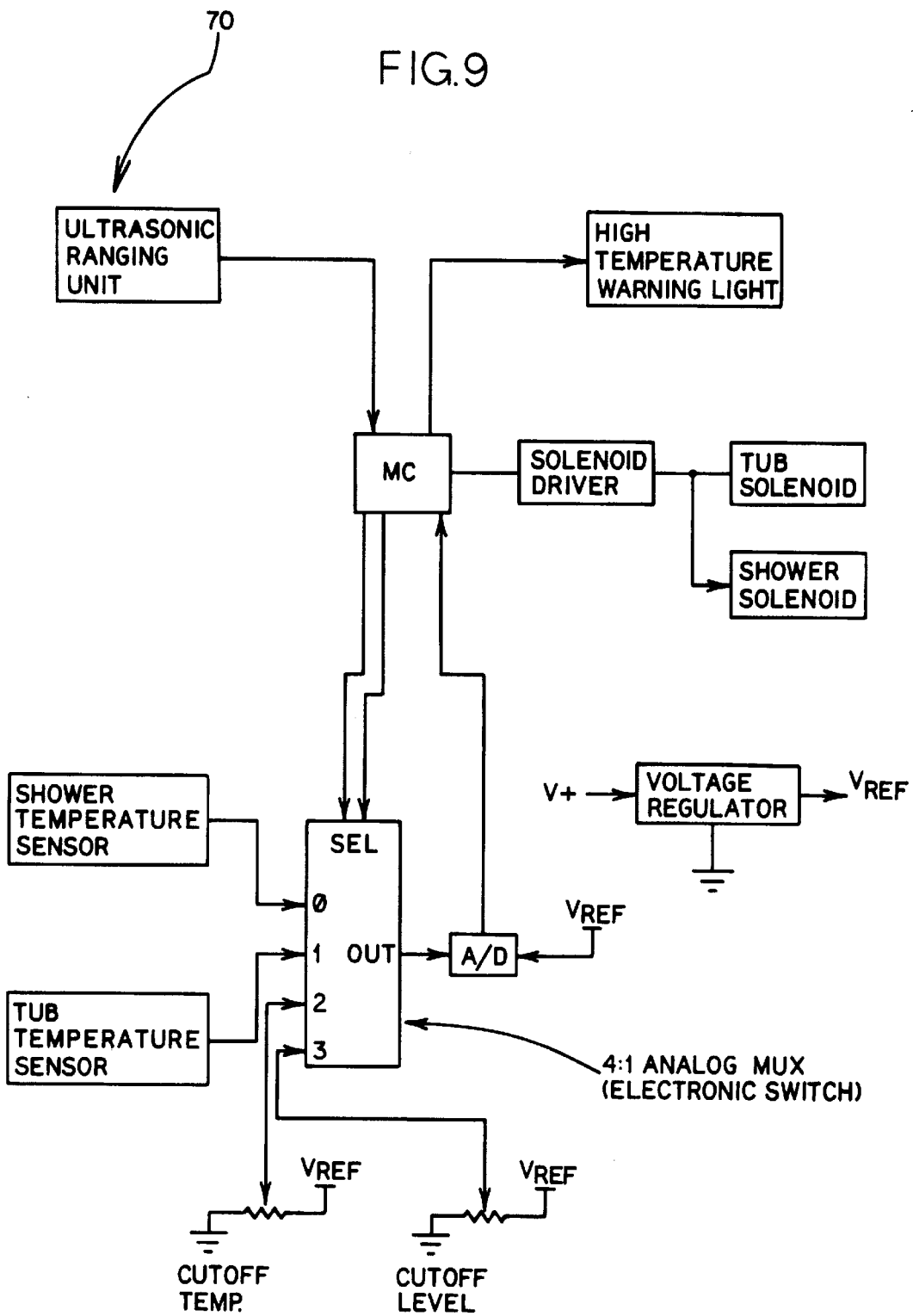
FIG. 9 is a schematic illustration of the alternative embodiment and the optional embodiment.
Figure 10:
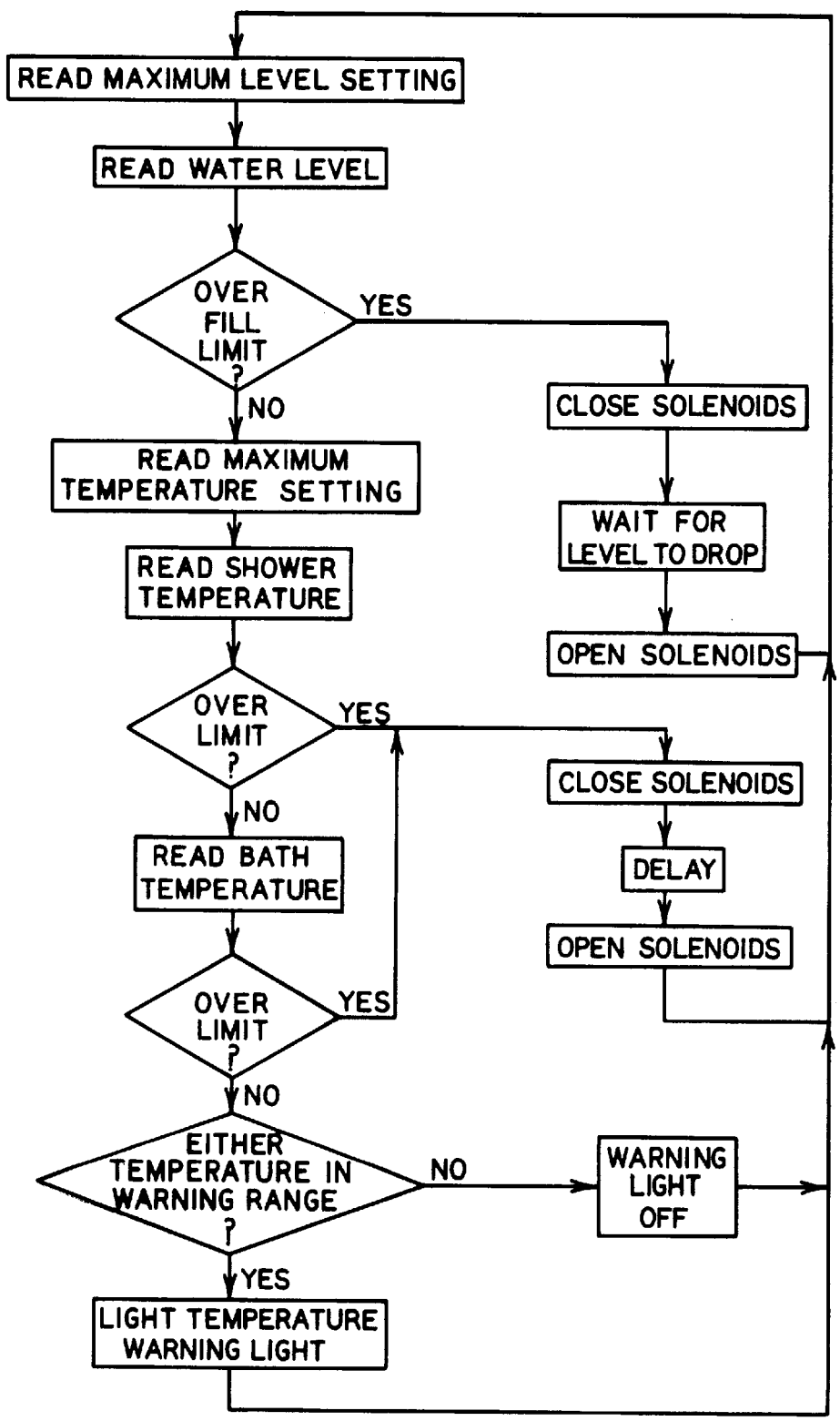
FIG. 10 is a flowchart of the alternative embodiment.

In an alternative embodiment as shown in FIGS. 6 through 8 of the drawings, a first solenoid valve 60 and a second solenoid valve 62 are electrically connected in parallel to the speaker 42. The first solenoid valve 60 is fluidly connected between a control valve 19 and a faucet of the bathtub 12. The second solenoid valve 62 is fluidly connected between the control valve 19 and a shower faucet of the bathtub 12. The first solenoid valve 60 and the second solenoid valve 62 close upon the closing of the activation switch 48 and the power switch 44 thereby terminating water flow into the bathtub 12.

In an optional embodiment 70 of the water level detecting and alarm system 10, a sonar water level sensing device may be included instead of a mechanical sensor. With reference to FIGS. 7 and 8, the optional embodiment 70 includes a sensor housing 71 designed for attaching the interior wall of a bathtub 12. Within the housing 71 is a sonar means 72 for detecting the water level within a bathtub. The sonar means 72 includes a sound wave generating means (not shown) for generating and projecting sound waves, and a return sound wave detection means (not shown) for detecting returning sound waves.

Coupled to the housing 71, is a shield member 73 having an elongate lower portion 74 that terminates at the lower end of the shield member 73. The shield member 73 designed so that it is mountable to the interior wall of a bathtub 12. The lower portion 74 has a channel 75 extending along it length and through the lower end of the shield member 73. The sound wave generating means and the return sound wave detection means are extended into the channel 75 so that water 14 within the channel 75 can be detected.

When the shield member 73 is mounted to the interior wall of a bathtub, the channel 75 of the lower portion is positioned adjacent the interior wall of a bathtub to define a water level detection tube as depicted in FIG. 8. Also, when the shield member 73 is mounted to the interior wall of a bathtub 12, the lower portion should be extended into the water 14 so that the channel 75 is in fluid communication with the water 14. This arrangement allows the sonar means 72 to determine the water level 14 in the bathtub by detecting the water level within the channel 75.

In this optional embodiment, the sonar means 72 is operatively coupled to the alarm device 40 in a similar set as the mechanical system so that the alarm device 40 generates an alarm when the sonar means detects a water level within a bathtub of a predetermined depth. In this embodiment the activation switch 48 of the alarm device 40 is operatively coupled to the sonar means 72 so that the activation switch 48 may be closed by the sonar means 72 when the sonar means 72 detects a water level 14 within a bathtub of a predetermined depth. Similarly the optional embodiment may have the activation switch 48 operatively connected to the first and second solenoid valves 60,62 to control the water and shower water faucet of a bathtub.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A water level detecting and alarm system for informing a user when a water level within a bathtub has risen to or above a desired level, comprising:

a housing having an opening at one end forming a lower lumen and a closed end opposite thereof thereby defining an interior portion;

a securing means attached to a side of said housing for adjustably securing to an interior surface of said bathtub corresponding to desirable water level;

a partition within said housing traverse to a longitudinal axis of said housing;

a tube projecting within and through said partition coaxial with said longitudinal axis of said housing;

a shaft having a flanged end and a lower end, wherein said shaft slidably projects through said tube;

a float slidably projecting within said lower lumen of said housing for having a latitude similar to said water level within said bathtub, wherein said float is secured to said lower end of said shaft for elevating and descending said shaft corresponding to said water level and wherein said flanged end prevents said float from being completely removed from said housing; and an alarm device within said housing engageable by said flanged end of said shaft, whereafter upon engagement by said flanged end with said alarm device, said alarm device emits an audible alarm warning a user that said water level is at a desirable level.

2. The water level detecting and alarm system of claim 1, wherein said securing means comprises a suction cup.

3. The water level detecting and alarm system of claim 2, wherein said alarm device comprises:

an activation switch for engagement with said flanged end of said shaft, wherein said activation switch is normally open;

a power source electrically connected to said activation switch; and a speaker electrically connected to said activation switch opposite of said power source for emitting said audible alarm upon a closing of said activation switch by said flanged end of said shaft.

4. The water level detecting and alarm system of claim 3, wherein said alarm device further includes a power switch electrically connected between said activation switch and said power source for allowing a user to manually control operation, and wherein said power switch is secured within an upper portion of said housing.

5. The water level detecting and alarm system of claim 4, including a first solenoid valve and a second solenoid valve electrically connected in parallel to said speaker, wherein said first solenoid valve is fluidly connected between a control valve and a faucet of said bathtub, and wherein said second solenoid valve is fluidly connected between said control valve and a shower faucet of said bathtub, wherein said first solenoid valve and said second solenoid valve close upon the closing of said activation switch and said power switch.

6. A water level detecting and alarm system for informing a user when the water level within a bathtub has risen to or above a desired level, comprising:

a sensor housing being attachable to an interior wall of a bathtub;

a sonar means for detecting the water level within a bathtub, said sonar means including a sound wave generating means for generating and projecting sound waves, and a return sound wave detection means for detecting returning sound waves, said sonar means being contained within said sensor housing;

a shield member having an elongate lower portion terminating at a lower end, said lower portion having a channel extending along the length of said lower portion and through said lower end of said shield member, said sensor housing being coupled to said shield member, said sound wave generating mean and said return sound wave detection mean being extended into the channel of said lower portion, said shield member being mountable to the interior wall of a bathtub with the channel of said lower portion being positioned adjacent the interior wall with said lower extending into water contained by the bathtub so that said channel is in fluid communication with water, wherein the shield member functions to shield a top surface of water in said channel from disturbances in a top surface of water outside of said shield member in said bathtub for reducing the effect of the disturbances on the sound waves of of said sonar means; and an alarm device being operatively coupled to said sonar means, said alarm device generating an alarm when said sonar means detects a water level within a bathtub of a predetermined depth.

7. The water level detecting and alarm system of claim 6, wherein said alarm device includes:

an activation switch operatviely coupled to said sonar means, wherein said activation switch is normally open, said sonar means being operationally coupled to said activation switch to permit closing of said activation switch by said sonar means when said sonar means detects a water level within a bathtub of a perdetermined depth;

a power source electrically connected to said activation switch; and a speaker electrically connected to said activation switch opposite of said power source for emitting said audible alarm upon a closing of said activation switch by said sonar means.

8. The water level detecting and alarm system of claim 7, wherein said alarm device further includes a power switch electrically connected between said activation switch and said power source for allowing a user to manually control operation, and wherein said power switch is secured within an upper portion of said housing.

9. The water level detecting and alarm system of claim 8, further comprising a first solenoid valve and a second solenoid valve electrically connected in parallel to said speaker, wherein said first solenoid valve is fluidly connected between a control valve and a faucet of a bathtub, and wherein said second solenoid valve is fluidly connected between said control valve and a shower faucet of a bathtub, wherein said first solenoid valve and said second solenoid valve close upon the closing of said activation switch and said power switch.

10. A water level detecting and alarm system for informing a user when the water level within a bathtub has risen to or above a desired level, comprising:

a sensor housing being attachable to an interior wall of a bathtub;

a sonar means for detecting the water level within a bathtub, said sonar means including a sound wave generating means for generating and projecting sound waves, and a return sound wave detection means for detecting returning sound waves, said sonar means being contained within said sensor housing;

a shield member having an elongate lower portion terminating at a lower end, said lower portion having a channel extending along the length of said lower portion and through said lower end of said shield member, said sensor housing being coupled to said shield member, said sound wave generating means and said return sound wave detection means being extended into the channel of said lower portion, said shield member being mountable to the interior wall of a bathtub with the channel of said lower portion being positioned adjacent the interior wall with said lower portion extending into water contained by the bathtub so that said channel is in fluid communication with the water, wherein the shield member functions to shield a top surface of water in said channel from disturbances in a top surface of water outside of said shield member in said bathtub for reducing the effect of the disturbances on the sound waves of said sonar means;

an alarm device being operatively coupled to said sonar means, said alarm device generating an alarm when said sonar means detects a water level within a bathtub of a predetermined depth;

wherein said alarm device includes:

an activation switch operatively coupled to said sonar means, wherein said activation switch is normally open, said sonar means being operationally coupled to said activation switch to permit closing of said activation switch by said sonar means when said sonar means detects a water level within a bathtub of a predetermined depth;

a power source electrically connected to said activation switch;

a speaker electrically connected to said activation switch opposite of said power source for emitting said audible alarm upon a closing of said activation switch by said sonar means; and a power switch electrically connected between said activation switch and said power source for allowing a user to manually control operation, and wherein said power switch is secured within an upper portion of said housing; and a first solenoid valve and a second solenoid valve electrically connected in parallel to said speaker, wherein said first solenoid valve is fluidly connected between a control valve and a faucet of a bathtub, and wherein said second solenoid valve is fluidly connected between said control valve and a shower faucet of a bathtub, wherein said first solenoid valve and said second solenoid valve close upon the closing of said activation switch and said power switch.

\* \* \* \* \*